M. F. CARR.
FASTENER.
APPLICATION FILED NOV. 27, 1917.
1,300,586.
Patented Apr. 15, 1919.
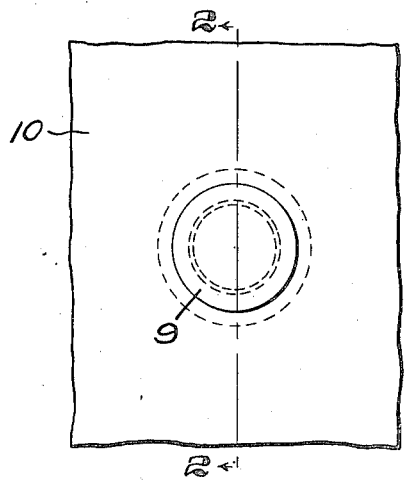
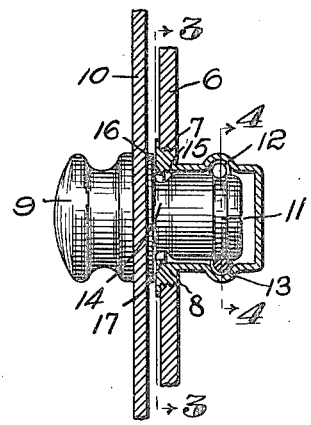
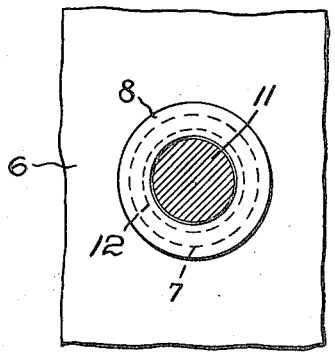
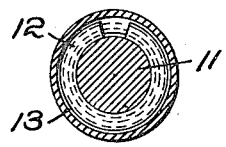
Inventor:
Moses F. Carr.
By Emery, Booth, Janney & Varney
Attys.

UNITED STATES PATENT OFFICE.

MOSES F. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,300,586. Specification of Letters Patent. Patented Apr. 15, 1919.

Application filed November 27, 1917. Serial No. 204,255.

*To all whom it may concern:*

Be it known that I, MOSES F. CARR, a citizen of the United States, and a resident of Newton, in the county of Middlesex, Commonwealth of Massachusetts, (whose post-office address is care of Carr Fastener Company, Cambridge, Massachusetts,) have invented an Improvement in Fasteners, of which the following description, in connection with the accompanying drawings, is a specification, like characters on the drawings representing like parts.

This invention pertains to improvements in separable fasteners, and more particularly, though not exclusively, to improvements in fasteners for use in connection with the attachment of automobile curtains to the bodies of automobiles.

In the drawings:

Figure 1 is a front elevation of a preferred form of one embodiment of my invention;

Fig. 2 is a section thereof on the line 2—2 of Fig. 1;

Fig. 3 is a section, partly in elevation, on the line 3—3 of Fig. 2;

Fig. 4 is a section on the line 4—4 of Fig. 2; and

Fig. 5 shows a preferred form of spring jaw for use in connnection with my invention.

In the illustrative embodiment of my invention shown in the drawings, I have shown a sheet metal portion 6 of the body of an automobile threaded at 7 to receive a socket 8, preferably substantially flush with the exterior of the car and adapted to coöperate with the stud 9 attached in any suitable way to an automobile curtain 10. The stud 9 is preferably provided with a groove 11 adapted to be engaged by a spring jaw 12, herein shown as a ring of wire entered in an annular depression 13 in the socket casing 8. The stud 9 is preferably provided with a second annular groove or depression 14 at a point adjacent the front of the socket casing 8 and providing shoulders 15 adapted to be engaged by a projection 16, 17 adjacent the outside end of the aperture in the casing 8. The opening between the projection 16, 17 is sufficient to permit the entrance of the stud 9 and to permit withdrawal thereof, providing such entrance or withdrawal is made in a direction substantially axial of the stud and socket; but if force is exerted in a direction not substantially axial of the stud and socket, the shoulder 15 will engage the projection 16, 17 and prevent withdrawal of the stud from the socket.

The operation of the fastener device is very simple, involving merely the entrance of the stud into the socket by the exertion of pressure in a direction axial of the stud and socket to spring the annular ring 12 over the head portion of the stud which is beyond the groove 11. Similarly withdrawal of the stud from the socket may be effected by exerting sufficient force in a direction substantially axial of the stud and socket to spring open the resilient jaw means 12, thereby to permit the passage of the head of the stud past such jaw means.

If, for any reason, the socket gets out of order, it can be easily unscrewed from the outside of the body of the car and a new socket inserted in its place, without the necessity for interference with the interior finish of the automobile body.

While I have shown and described one embodiment of my invention, it will be understood that changes involving omission, alteration, substitution and reversal of parts, and even changes in the mode of operation, may be made without departing from the scope of my invention, which is best defined in the following claims.

Claims:

1. A stud and socket fastener comprising, in combination, a stud, and a socket therefor providing yielding jaw means and a portion unyieldingly holding said stud in engaged position when out of axial alinement with said socket; thereby permitting separation of stud and socket only when force is exerted in a direction substantially axial of said stud and socket.

2. A stud and socket fastener comprising, in combination, a stud having a plurality of recessed portions therein, and a socket providing a resilient jaw for engagement with one of said recessed portions and fixed jaw means for engagement with another of said recessed portions when said stud is tipped relative to said socket.

3. A stud and socket fastener comprising, in combination, a stud providing two recessed portions, one adjacent the head thereof and the other at a point considerably removed from said head, and a socket providing a resilient jaw for engagement with the first of said recessed portions and considerably removed from the entrance aperture of said socket, said socket providing a projection adjacent the entrance aperture thereof for engagement with the second of said recessed portions.

In testimony whereof, I have signed my name to this specification.

MOSES F. CARR.